US011120213B2

(12) United States Patent
Shang et al.

(10) Patent No.: US 11,120,213 B2
(45) Date of Patent: Sep. 14, 2021

(54) INTELLIGENT VERIFICATION OF PRESENTATION OF A USER INTERFACE

(71) Applicant: VMware, Inc., Palo Alto, CA (US)

(72) Inventors: Lucy Shang, Palo Alto, CA (US); Daniel Ni, Beijing (CN); Zhenjun Zhuo, Beijing (CN); Zohar Hirshfeld, Palo Alto, CA (US); Jim Peng, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 66 days.

(21) Appl. No.: 15/879,897

(22) Filed: Jan. 25, 2018

(65) Prior Publication Data

US 2019/0228058 A1    Jul. 25, 2019

(51) Int. Cl.
| | | |
|---|---|---|
| *G06F 16/00* | (2019.01) | |
| *G06F 40/197* | (2020.01) | |
| *G06K 9/00* | (2006.01) | |
| *G06F 9/455* | (2018.01) | |
| *G06F 16/958* | (2019.01) | |
| *G06F 40/58* | (2020.01) | |
| *G06F 40/106* | (2020.01) | |
| *G06F 40/226* | (2020.01) | |

(52) U.S. Cl.
CPC ........ *G06F 40/197* (2020.01); *G06F 9/45529* (2013.01); *G06F 16/986* (2019.01); *G06F 40/106* (2020.01); *G06F 40/226* (2020.01); *G06F 40/58* (2020.01); *G06K 9/00469* (2013.01)

(58) Field of Classification Search
CPC .............. G06F 9/45529; G06F 16/986; G06F 17/2288; G06F 17/289; G06K 9/00469
See application file for complete search history.

(56) References Cited

U.S. PATENT DOCUMENTS

| | | | | | |
|---|---|---|---|---|---|
| 6,014,638 | A | * | 1/2000 | Burge | G06Q 30/02 705/27.1 |
| 6,300,947 | B1 | * | 10/2001 | Kanevsky | G06F 16/9577 715/866 |
| 6,564,170 | B2 | * | 5/2003 | Halabieh | G06F 9/451 702/181 |
| 7,107,535 | B2 | * | 9/2006 | Cohen | G06F 3/0481 715/736 |
| 7,120,515 | B2 | * | 10/2006 | Floeder | G06T 7/0004 700/122 |
| 7,458,037 | B2 | * | 11/2008 | Fuchs | G01C 21/36 715/781 |

(Continued)

*Primary Examiner* — Maikhanh Nguyen
(74) *Attorney, Agent, or Firm* — Thomas Horstemeyer, LLP

(57) ABSTRACT

Various examples for performing an intelligent verification of a user interface to be rendered or otherwise presented, for instance, in a display of a client device are described. A web server can simulate, for at least one of a plurality of geographic locations, a rendering of a web page using hypertext markup language (HTML) for various geographic locations, where the rendering of the web page is simulated using a corresponding language. The web server can identify an anomaly in at least a portion of the web page as rendered based on a user interface verification rule stored in a data store. The web server can perform a remedial action based at least in part on a type of the anomaly identified.

20 Claims, 8 Drawing Sheets

(56) References Cited

U.S. PATENT DOCUMENTS

| | | | |
|---|---|---|---|
| 7,734,412 B2* | 6/2010 | Shi | G01C 21/32 |
| | | | 701/421 |
| 9,141,792 B2* | 9/2015 | Baluda | G06F 21/552 |
| 9,244,755 B2* | 1/2016 | Huang | G06F 11/0775 |
| 10,223,338 B2* | 3/2019 | Stoicov | G06F 3/04842 |
| 2002/0152237 A1* | 10/2002 | Cohen | G06F 3/0481 |
| | | | 715/205 |
| 2005/0144094 A1* | 6/2005 | Floeder | G06T 7/0004 |
| | | | 700/122 |
| 2007/0038962 A1* | 2/2007 | Fuchs | G01C 21/36 |
| | | | 715/855 |
| 2008/0027642 A1* | 1/2008 | Winberry | G06F 16/29 |
| | | | 701/455 |
| 2008/0027937 A1* | 1/2008 | Winberry | G06F 16/29 |
| 2008/0065325 A1* | 3/2008 | Geelen | G01C 21/32 |
| | | | 701/414 |
| 2008/0109159 A1* | 5/2008 | Shi | G01C 21/32 |
| | | | 701/421 |
| 2008/0147311 A1* | 6/2008 | Zoller | G01C 21/3682 |
| | | | 701/533 |
| 2008/0195656 A1* | 8/2008 | Winberry | G06F 16/29 |
| 2008/0201067 A1* | 8/2008 | Winberry | G06F 16/29 |
| | | | 701/532 |
| 2008/0201385 A1* | 8/2008 | Winberry | G06F 16/29 |
| 2008/0221785 A1* | 9/2008 | Winberry | G06F 16/29 |
| | | | 701/532 |
| 2018/0329801 A1* | 11/2018 | McKee | G06F 40/106 |

* cited by examiner

INTELLIGENT VERIFICATION OF PRESENTATION OF A USER INTERFACE

BACKGROUND

Website globalization refers to the process where developers attempt to develop a web page that is displayed uniformly regardless of a location where the web page is accessed and regardless of a language of text used in a web page. Displaying documents, such as web pages, as intended by a developer can be problematic due to language formatting and other errors, often causing a web page to present garbled messages, truncated text, inappropriate formatting, overlapping layouts, etc. These issues generally occur in non-English environments by utilizing locale-sensitive application programming interfaces (APIs). As these APIs are location-based, the issues caused by the APIs when properly presenting a web page or other document vary dramatically. Thus, generalized approaches to properly display web pages are ineffective.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the intelligent verification of a user interface to be rendered or otherwise presented, for instance, in a display of a client device. Generalized approaches for performing website globalization, where developers attempt to develop a web page that is displayed uniformly regardless of a location, can be ineffective. For instance, in non-English environments, locale-sensitive application programming interfaces (APIs) are used that cause various issues when attempting to properly present a user interface, such as a web page, in a display.

Accordingly, various examples for performing an intelligent verification of a display of a user interface are described. In one example, one or more computing devices can be configured to simulate a rendering of a web page using hypertext markup language (HTML) for various geographic locations, where the rendering of the web page is simulated using a language corresponding to the various geographic locations. The computing device can analyze the simulated web page to identify one or more anomalies, which can include content displayed improperly. Improperly displayed content can include, for example, garbled text, truncated text, inappropriate document formatting, substituted characters, overlapping portions of the user interface, or other display issues, as can be appreciated.

In some examples, the computing device can identify an anomaly based on a user interface verification rule stored in a data store corresponding to the geographic location or to a particular type of content to be presented in the web page. Further, in response to an anomaly being identified in the web page, the computing device can identify a remedial action to perform based on a type of the anomaly identified. In some examples, the remedial action can include a task that can be performed by the computing device automatically to cure the anomaly such that subsequent renderings of the web page will include content properly shown, regardless of geographic location or language. Thus, the present disclosure includes specific and computer-implemented examples for improving a uniform display of a user interface or web page across client devices regardless of geographic location, even when content is presented in languages that vary from one geographic location to another.

Figure 1A:
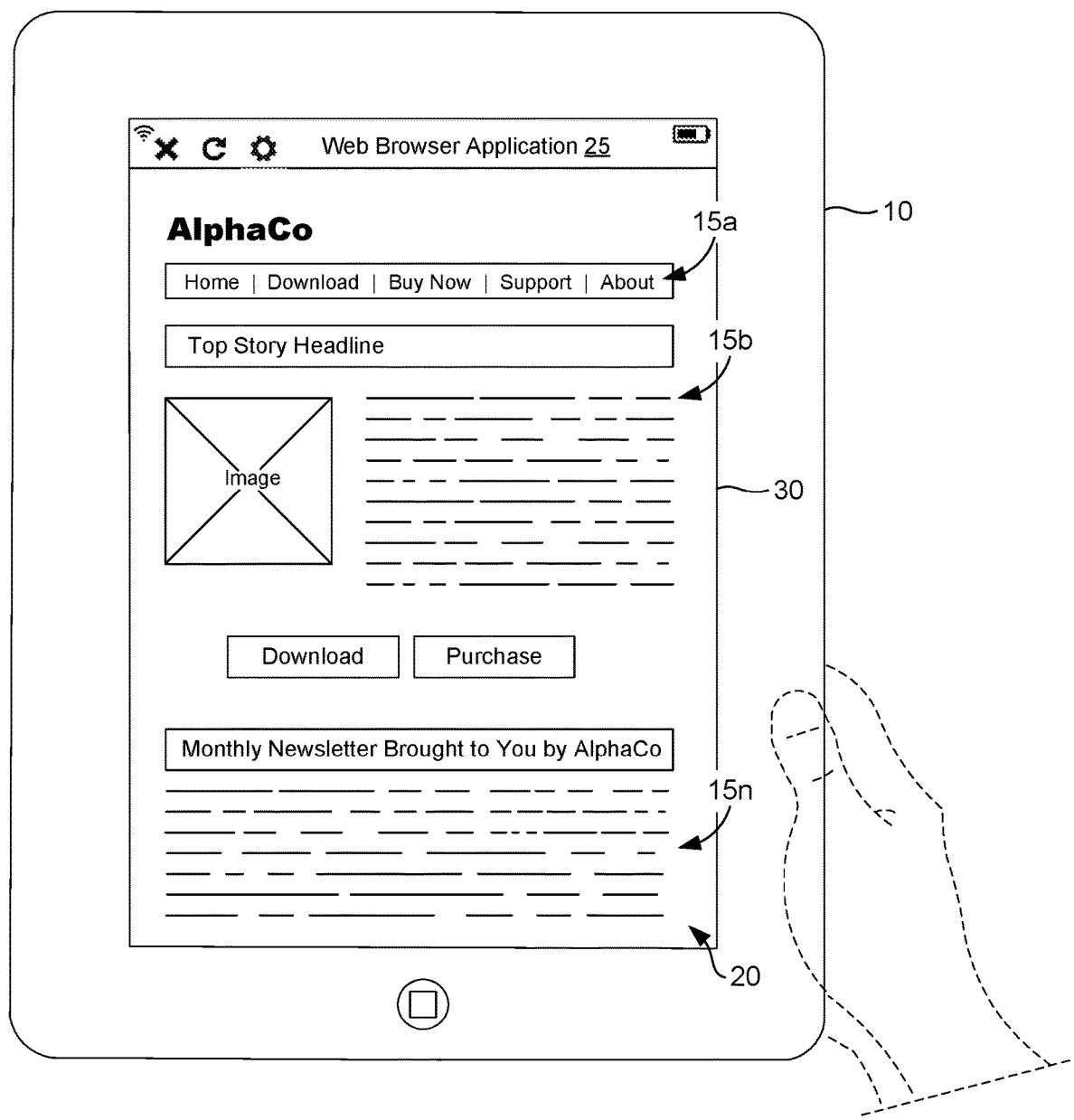
FIGS. 1A, 1B, and 1C are drawings of a client device showing a user interface in a display.

With reference to FIG. 1A, a client device 10 is shown being held by a user or an operator, where the client device 10 is operated by the user to view content 15a . . . 15n shown in a user interface 20. For instance, a user can select a web browser application 25 and navigate one or more user interfaces 20, which can include web pages in some examples. The web browser application 25 can cause the content 15 to be rendered and shown in a display 30 of the client device 10. The content 15 in the user interface 20 can include images, text, such as American Standard Code for Information Interchange (ASCII) or non-ASCII text, hyperlinks, applets, Flash® content, or other content 15 that is visually perceivable by a user through the display 30. The arrangement of the content 15 in the user interface 20 may be based on hypertext markup language (HTML) code included in a document, such as an HTML file, that directs the web browser application 25 to present the user interface 20.

FIG. 1A illustrates a non-limiting example where the content 15 is shown in English although, in other examples, the content 15 can be shown in other languages. For instance, in some embodiments, a web server can serve up a web page or other user interface 20 based on a location of a client device 10 requesting the web page or other user interface 20. To this end, a client device 10 accessing a web page in Japan can be served content 15 in the Japanese language, a client device 10 accessing a web page in Spain can be served content 15 in the Spanish language, a client device 10 accessing a web page in China can be served content 15 in the Mandarin language, and so forth. The content 15 can be served up in a particular language by performing a machine translation or by serving up translated text access from a data store or other memory.

Figure 1B:
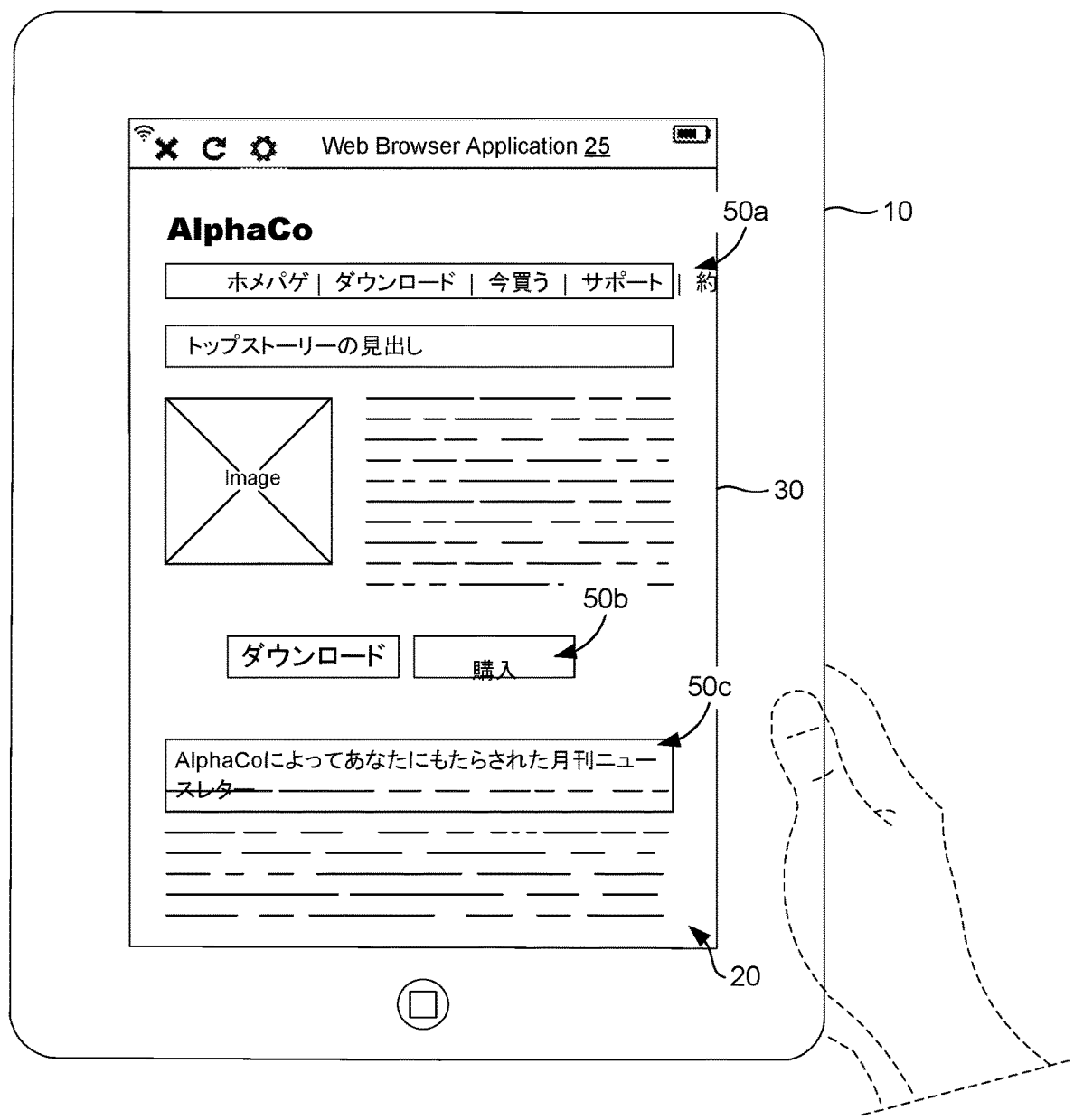

However, when serving up content 15 in a language, various issues can occur in the display of the content 15. For instance, a web developer may have designed and developed the web page in English, not accounting for differences in the display of non-English text. As shown in FIG. 1B, when Japanese content is served up in the user interface 20, various formatting issues can be identified in various regions 50a . . . 50n of the user interface 20. Moreover, issues when presenting Japanese characters can occur. Referring first to region 50*a*, the navigation menu for the user interface 20 has expanded beyond its background area, causing text to expand beyond its intended region of the user interface 20. Similarly, in region 50*b*, translated content is not formatted correctly in a vertical and horizontal center of a button, instead overlapping a portion of the button. In region 50*c*, translated content does not fit in a table or an HTML container, such as a <DIV> container, causing the text in the region 50*c* to appear incorrectly in the user interface 20. The inconsistencies between the user interface 20 of FIG. 1A and the user interface 20 of FIG. 1B are referred to as anomalies as they are unintended by a web developer.

Figure 1C:
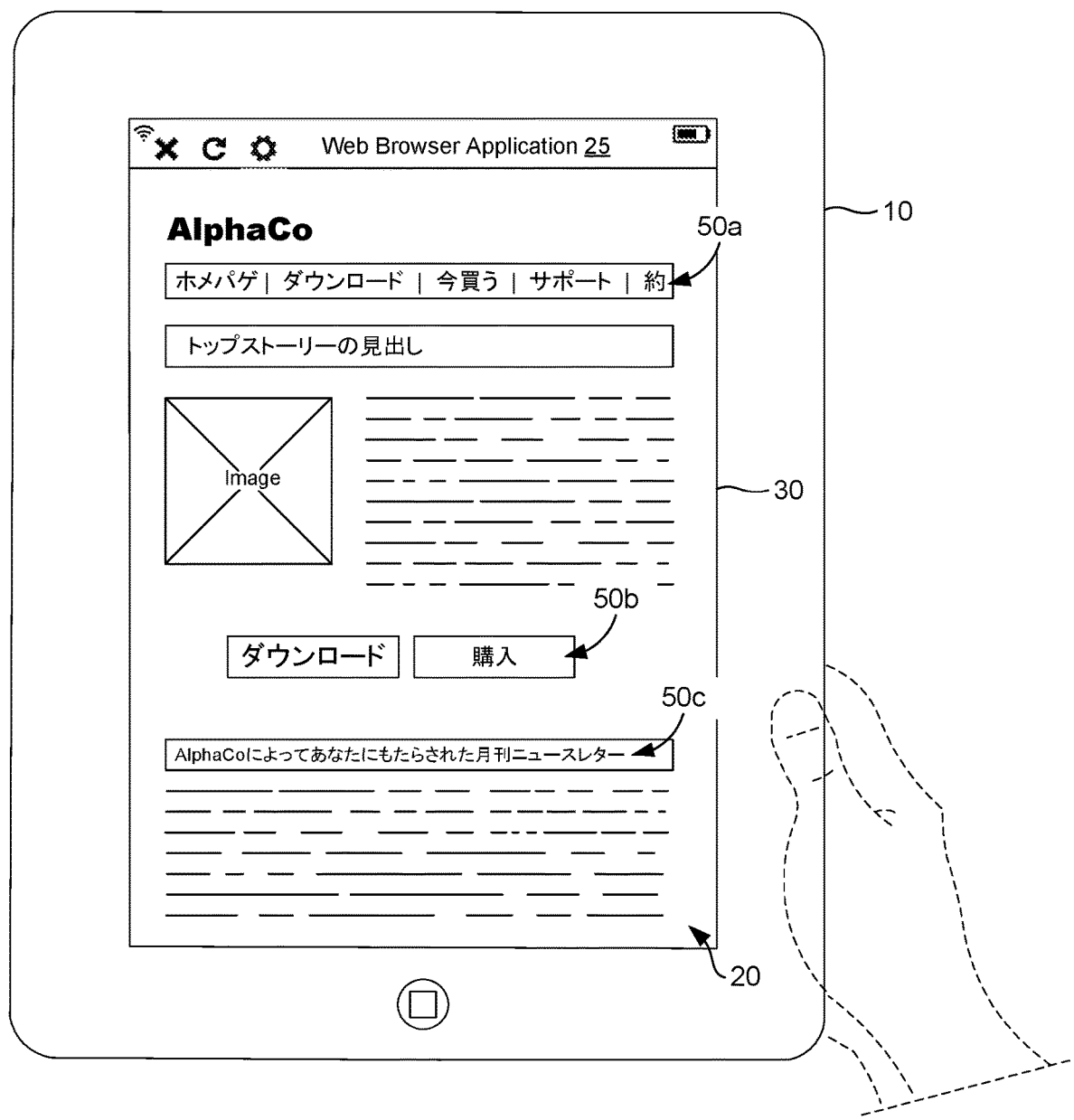

To alleviate issues that arise out of the inconsistent display of user interfaces 20 based on geographic location, language, or similar concepts, various examples for performing an intelligent verification of a display of a user interface are described. In some examples, a computing device, such as a web server, can be configured to simulate a rendering of a web page using an HTML document, where the web page is simulated for various geographic locations. For instance, a web server can be configured to simulate the rendering of the web page using a language corresponding to a geographic location. The web server can then analyze the simulated web page to identify one or more anomalies, which can include content displayed improperly. Improperly displayed content, in some examples, can include garbled text, truncated text, inappropriate document formatting, overlapping portions of the user interface, improperly substituted characters, or other display issues, as can be appreciated. For instance, as shown in FIG. 1C, issues with the user interface 20 shown in FIG. 1B have been resolved by adjusting the formatting of the user interface 20 or alleviating issues dealing with ASCII or non-ASCII characters. Specifically, the text expanding and overlapping unintended regions of the user interface 20 are identified and resolved such that the user interface 20 is shown as a web developer may have intended.

Figure 2:
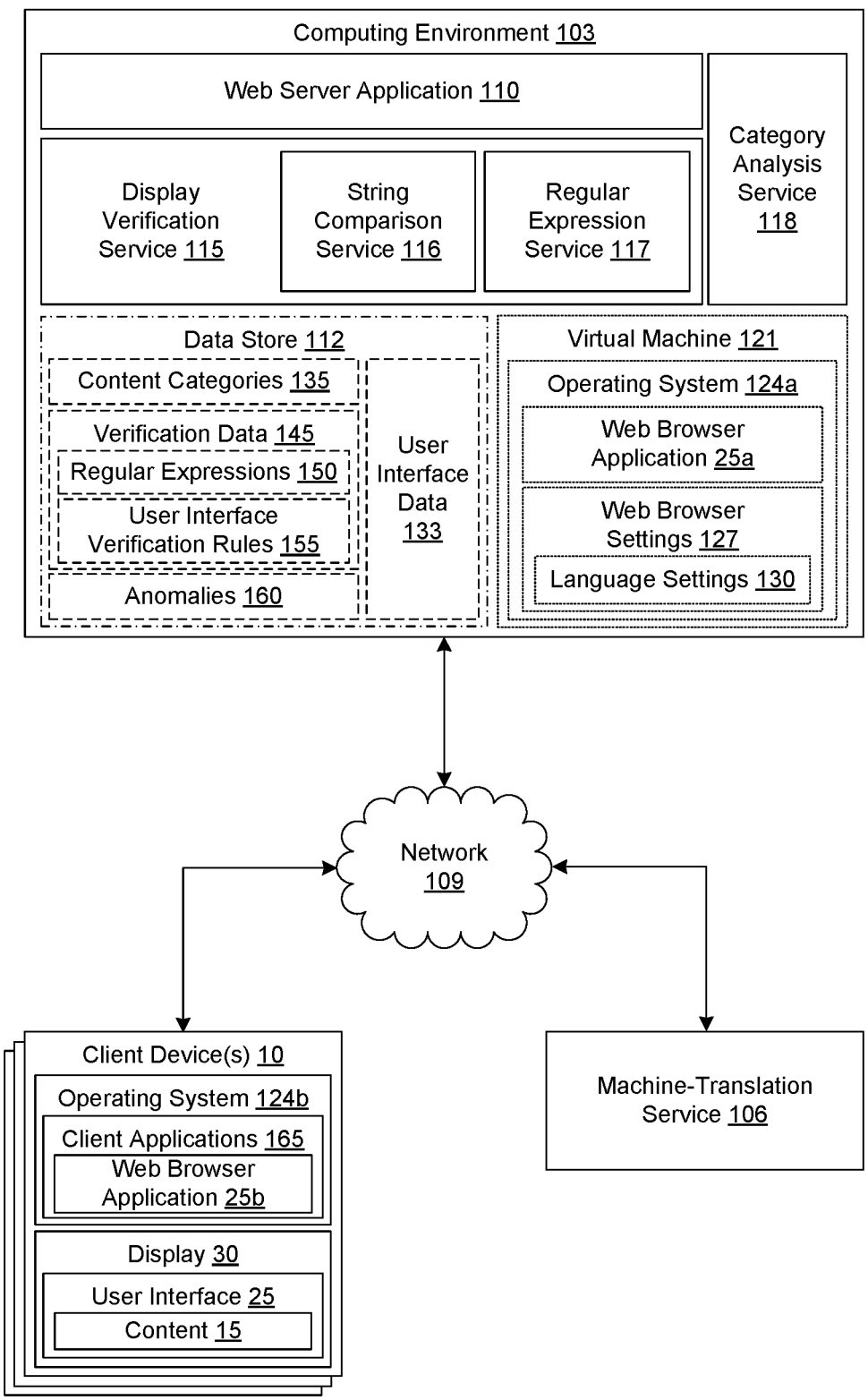
FIG. 2 is a drawing of a networked environment for intelligent verification of a presentation of a user interface that includes a display verification service and a category analysis service.

Referring now to FIG. 2, shown is an example of a networked environment 100. The networked environment 100 can include a computing environment 103, client devices 10, and a machine-translation service 106 in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 and the machine-translation service 106 can include, for example, a server computer or any other system providing computing capability. Alternatively, the computing environment 103 and the machine-translation service 106 can include a plurality of computing devices that are arranged, for example, in one or more server banks, computer banks, or other arrangements. The computing devices can be located in a single installation or can be distributed among many different geographical locations. The computing environments 103 can also include or be operated as one or more virtualized computer instances. The computing environment 103 and the machine-translation service 106 can include a grid computing resource or any other distributed computing arrangement.

For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 10 remotely over the network 109, the computing environment 103 can be described as a remote computing environment 103 or a remote service. As the computing environment 103 can include a web server application 110, such as the Apache® HTTP web server, the computing environment 103 can further include a web server in some examples.

The computing environment can include a data store 112. The data store 112 can include memory of the computing environment 103, mass storage resources of the computing environment 103, or any other storage resources on which data can be stored by the computing environment 103. The data store 112 can include one or more relational databases, such as a structured query language (SQL) database or a no-SQL database. The data store 112 can also include non-relational databases in some examples. The data stored in the data store 112, for example, can be associated with the operation of the various applications or functional entities described below.

The components executed on the computing environment 103 can include, for example, the web server application 110, a display verification service 115, a category analysis service 118, as well as other applications, services, processes, systems, engines, or functionality not discussed in detail herein. The display verification service 115 can include a string comparison service 116 and a regular expression service 117, as will be described.

The web server application 110 can serve up user interfaces 20, such as web pages, to a web browser application 25. In some examples, the web server application 110 can interact with the machine-translation service 106 to dynamically include translated content as it serves up a user interface 20, such as a web page. For instance, content 15 in English can be translated to Japanese in response to a request from a web browser application 25 executing in Japan. As such, static content 15 is not required to be stored in the data store 112, in some examples.

The display verification service 115 can perform an intelligent verification of a display of a user interface 20. In some examples, the display verification service 115 can simulate a rendering of a web page or other user interface 20 in a web browser application 25*a* and analyze what is or would be rendered by the web browser application 25 in a display 30 of a client device 10. For instance, the display verification service 115 can use a virtual machine 121 to simulate a rendering of a web page or other user interface 20. The virtual machine 121 can include an operating system 124*a* having a web browser application 25*a*, or other client application, installed thereon. The web browser application 25*a* can include web browser settings 127, which can include, for instance, language settings 130. In a traditional setting, language settings 130 can include a preferred language for a user of the web browser application 25*a*. However, the display verification service 115 can dynamically adjust the language settings 130 (or other web browser settings 127) to render a web page or other user interface 20 for a geographic location to analyze content 15 rendered by the web browser application 25*a*. Additionally, the virtual machine 121 can be configured for one or more display resolutions and can be configured to spoof a geographic location of the virtual machine 121 for rendering user interfaces 20 for varying geographic locations.

The category analysis service 118 can categorize or classify content 15 as well as analyze content 15 rendered by the web browser application 25a to determine whether the content 15 has been rendered as intended. For instance, the category analysis service 118 can identify an amount of text in a simulated web page and categorize the amount of text as a date, a time, a translation, a string, or other category of content 15. Based on a category of the content 15, the display verification service 115 can determine whether the content 15 was properly displayed, as will be discussed.

The data stored in the data store 112 can include, for example, user interface data 133, content categories 135, verification data 140, as well as other data. The user interface data 133 can include, for example, web page data, such as HTML, JavaScript®, cascading style sheet (CSS), extensible markup language (XML), Flash®, or other code that is used by a web browser application 25a, 25b in rendering a web page. Similarly, the user interface data 133 can include, for example, text, code, or other data that can be used by a native client application in rendering a user interface 20 in a display 30.

The content categories 135 can include various types of content 15 to be analyzed in a simulated rendering of a web page or other user interface 20. For instance, content categories 135 can include a date, a time, a number, a currency, a sentence or other string of characters, or other type of content 15. The verification data 145 can include, for instance, regular expressions 150 that can be used in identifying a content category 135 for content 15 in a user interface 20 as well as verifying whether the content 15 will be shown properly in the user interface 20 when rendered.

Further, the verification data 145 can include one or more user interface verification rules 155. User interface verification rules 155 can include criteria that the display verification service 115 can utilize to determine whether a user interface 20 is shown properly in a display 30. In some examples, the user interface verification rules 155 can be specified by an administrator or a web developer, for example, through an administrator console. The display verification service 115 can identify anomalies 160 in a user interface 20 based on whether the criteria specified through the user interface verification rules 155 are satisfied based on a simulated rendering of a web page or other user interface 20. For instance, a user interface verification rule 155 can specify a format that a date should be shown in for a particular geographic region. In the United States, a date may assume the format of "01-31-2020." In Europe, however, a date may assume the format of "2020-01-30." Thus, a user interface verification rule 155 can specify a particular way a date should be shown in a particular geographic location or in association with a particular language. To this end, a user interface verification rule 155 can also be indicative of a remedial action that can be performed by the display verification service 115 to alleviate an identified anomaly.

Similarly, a user interface verification rule 155 can specify a proper display a time corresponding to a geographic location. If a time is displayed incorrectly for a geographic location, the display verification service 115 can identify the incorrect display as an anomaly 160. In another example, a user interface verification rule 155 can specify a proper display a currency corresponding to a geographic location, such as dollars for the United States or the British Pound for the United Kingdom. Additionally, periods or comas can be used interchangeably depending on the geographic location. If a monetary amount or a currency is displayed incorrectly for a geographic location, the display verification service 115 can identify the incorrect display as an anomaly 160.

In another example, a user interface verification rule 155 can define an intended size of an amount of text or a container in the web page or other user interface 20 as rendered. For instance, the intended size can include a height or width in pixel value, ratio form, or other appropriate unit. If an amount of text causes a container to move or expand for a geographic location, the display verification service 115 can identify the incorrect display as an anomaly 160.

The client device 10 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 10 can also be equipped with networking capability or networking interfaces, including a localized networking or communication capability, such as a near-field communication (NFC) capability, radio-frequency identification (RFID) read or write capability, or other localized communication capability.

The client devices 10 can include an operating system 124b configured to execute various client applications 165, such as the web browser application 25b as well as other applications. Some client applications 165 can access network content served up by the computing environment 103 or other servers, thereby rendering a user interface 20 on a display 30, such as a liquid crystal display (LCD), touch-screen display, or other type of display device. To this end, some client applications 165 can include a web browser application 25 or a dedicated or native application, such as a mobile or client application. The user interface 20 can include a web page, a native application screen, or other interface. Further, other client applications 120 can include device management applications, enterprise applications, social networking applications, word processors, spreadsheet applications, media viewing application, or other applications.

Figure 3:
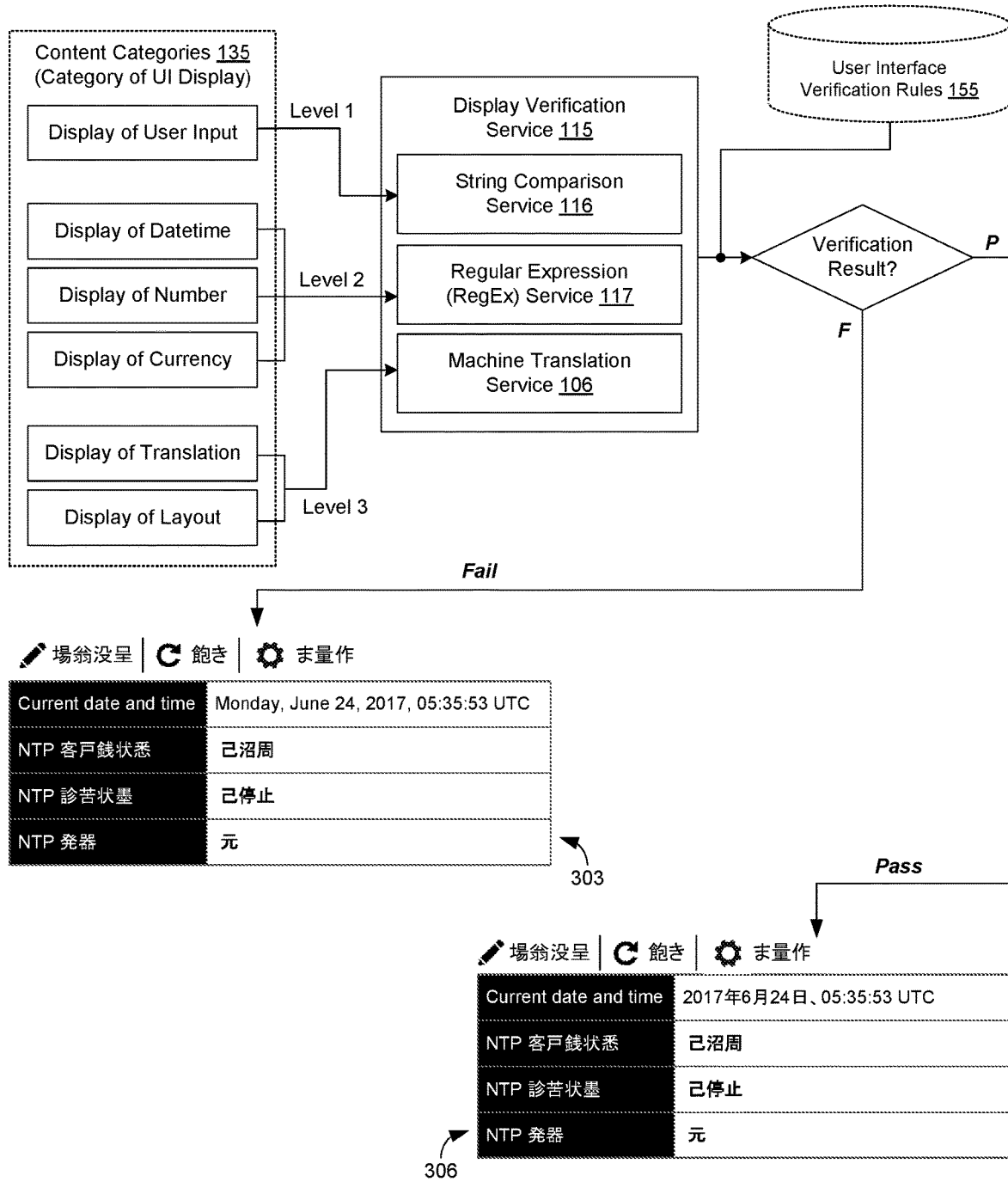
FIG. 3 is a drawing showing an example operation of the display verification service performing an intelligent verification of particular categories of content.

FIG. 3 is a drawing showing an example operation of the display verification service 115 performing an intelligent verification of content 15 based on content categories 135. As noted above, content categories 135 can include categories of content 15 to be shown in a user interface 20. Content categories 135 can include, for example, user input, a date/time, a number, a monetary amount or currency, a translation, a layout, as well as other categories. The display verification service 115 can perform different analyses to verify the proper display of the content 15 in a user interface 20. For instance, an administrator can define one or more user interface verification rules 155 or other criteria to apply based on a content category 135.

To this end, the display verification service 115 can verify whether content 15 is properly shown in a user interface 20 by comparing content 15 to be rendered in a user interface 20 (before the simulated rendering) to the actual content appearing in the simulated rendering of the user interface 20 (after the simulated rendering). In one example, the display verification service 115 can identify each string or amount of text in a user interface 20 and categorize the text to apply a content-specific approach when verifying the text. For instance, the display verification service 115 can perform string comparisons, regular expression matching, machine translation, and layout detection based on a content category 135.

For instance, if content 15 to be included in a user interface 20 is a date or a time, the display verification service 115 can utilize the regular expression service 117 to determine whether the format of the date or the time shown in a simulated rendering of a user interface 20 is correct based on a user interface verification rule 155. As shown in a first table 303 of FIG. 3, if a date and time of "Monday, June 25, 2017, 05:35:53 UTC" is output to a user interface 20 for a geographic location in Japan, the display verification service 115 can identify that the content 15 fails a user interface verification rule 155 and can raise an anomaly 160 due to the date and time being presented in a format not acceptable for Japan. Alternatively, a second table 306 shows the date and time presented in a format acceptable for Japan; thus, the display verification service 115 determines that the content 15 satisfies the user interface verification rules 155 and does not generate an anomaly 160.

The "Datetime" content category 135 can apply to any text that includes a month, day, year, week, hour, minute, seconds, or combination thereof. In some examples, the regular expression service 117 can determine whether a user interface verification rule 155 has been satisfied for the geographic location in the United States or other location that utilizes a similar format using the following regular expression:

^(0[1-9]|1[1-2])/(0[1-9]|1[0-9]|2[2-9]|3[0-1])/(1[0-9]
  [0-9][0-9]|2[0-9][0-9]|[0-9])$

In another example, the regular expression service 117 can determine whether a user interface verification rule 155 has been satisfied for Japan or other geographic location having a similar date or time format using the following regular expression:

(\\d{4})\u5e74(\\d{1,2})\u6708(\\d{1,2})\u65e5\\s
  (\u4E0A|\u5348|\u4E0B\u5348) (\\d{1,2}):
  (\\d{2}):(\\d{2})

In this example, the date of "2017年9月28日 下午2:34: 22" would pass the criteria specified by a user interface verification rule 155.

In another example, the display verification service 115 can identify user input to be included in a user interface 20, where user input can include data provided by a user in a textbox or similar field. In this case, the display verification service 115 can utilize the string comparison service 116. The string comparison service 116 can compare a string to be rendered in a user interface 20 and a string actually shown in the simulated rendering. As can be appreciated, in some situations, due to geographic locations, non-ASCII super codes, or other issues, the string to be rendered can be inadvertently concatenated or otherwise modified. For instance, non-ASCII characters in a string might be replaced with ASCII characters when a web page is rendered in a web browser application 25. Thus, the string comparison service 116 can determine whether a string to be rendered matches a string shown in a simulated rendering of a user interface 20.

In another example, the display verification service 115 can verify a display of a number to be included in a user interface 20. In some examples, the display verification service 115 can convert a number to be rendered in a user interface 20 to a floating-point number (also referred to as a "float"). The display verification service 115 can also convert a number actually shown in the simulated rendering of the user interface 20 to a floating-point number. The two floating-point numbers can then be compared to determine whether the floating-point numbers match. If the floating-point numbers do not match, the display verification service 115 can generate an anomaly 160.

In yet another example, the display verification service 115 can verify a display of a currency or a monetary amount.

In some examples, a monetary amount can be converted to a string where a leading or trailing character of the string can include a symbol for a currency. The display verification service 115 can verify the correct symbols, numbers, and units, as well as the order of the symbols, numbers, and units. For instance, the string "$23,456.56" would be correct for a geographic location that utilized the dollar currency while the string "23.456.56 €" would be correct for a geographic location that utilizes the euro currency. In the case of the dollar currency, the regular expression service 117 can determine whether a monetary amount satisfies one or more user interface verification rules 155 by applying the following regular expression:

{currency.symbol}{number}[K,M,B]?

In the case of the euro currency, the regular expression service 117 can determine whether a monetary amount satisfies one or more user interface verification rules 155 by applying the following regular expression:

{number}[K,M,B]?{currency.symbol}

Referring again to the example above, the monetary amount of "$23,456.56," when converted to a different currency, may increase in length and impact the formatting of the number or an HTML container than includes the number. For instance, when the monetary amount of "$23,456.56" is converted to yen, a longer string of "JP¥ 2610726.86" is used that can cause a table or other HTML container to increase in size, thereby impacting the display. The display verification service 115 can verify a display of the monetary amount such that the longer string does not impair the display of content in the user interface.

In yet another example, the display verification service 115 can verify a display of a translation. For instance, a body of a web page can include text in one of various languages where, depending on the geographic location of a user accessing the web page, text in a different language is presented. The display verification service 115 can analyze the text as shown in the simulated rendering of the web page to determine whether the text is shown in a proper language based on the geographic location. For instance, in Japan, the body of a web site should be shown in Japanese while in the United Kingdom, the body of the web site should be shown in English. The display verification service 115 can utilize the machine-translation service 106 to determine whether content 15 has been included in a proper language. The machine-translation service 106 can determine whether words or sentences in a body of a web site translate correctly given a language for a geographic location. For instance, the machine-translation service 106 can recognize that Japanese words and sentences appear in the user interface 20. If the language of text shown in the user interface 20 does not match the language of the geographic location, the display verification service 115 can generate an anomaly 160. Additionally, the machine-translation service 160 can translate text stored in the data store to be dynamically included in the user interface 20 from a first language to a second language, where the web server application 110 can include the text as translated to the second language in the user interface 20.

In another example, the display verification service 115 can verify a display of a layout of a user interface 20. For instance, the display verification service 115 can compare the size of text to be rendered to text shown in the simulated rendering of the web page or other user interface 20 to determine whether the sizes of the text match. Similarly, the display verification service 115 can compare a size of a container, such as a DIV container in HTML, based on pixel or ratio values. For instance, an HTML document may specify that a table should be one-hundred pixels×one-hundred pixels (or a 1:1 ratio). The display verification service 115 may analyze a size of the table in the simulated rendering of the web page to determine whether the table is actually one-hundred pixels×one-hundred pixels, or is some other size indicative of an anomaly 160 existing in the web page. For instance, if text in a table is not displayed properly, it can cause the size of the table (as actually shown) to adjust, as shown in FIG. 1B. Further, the display verification service 115 can identify potential overlaps or truncations of components in a user interface 20, such as buttons, containers, images, or other content 15. If any of these issues are identified, the display verification service 115 can generate an anomaly 160.

Figure 4:
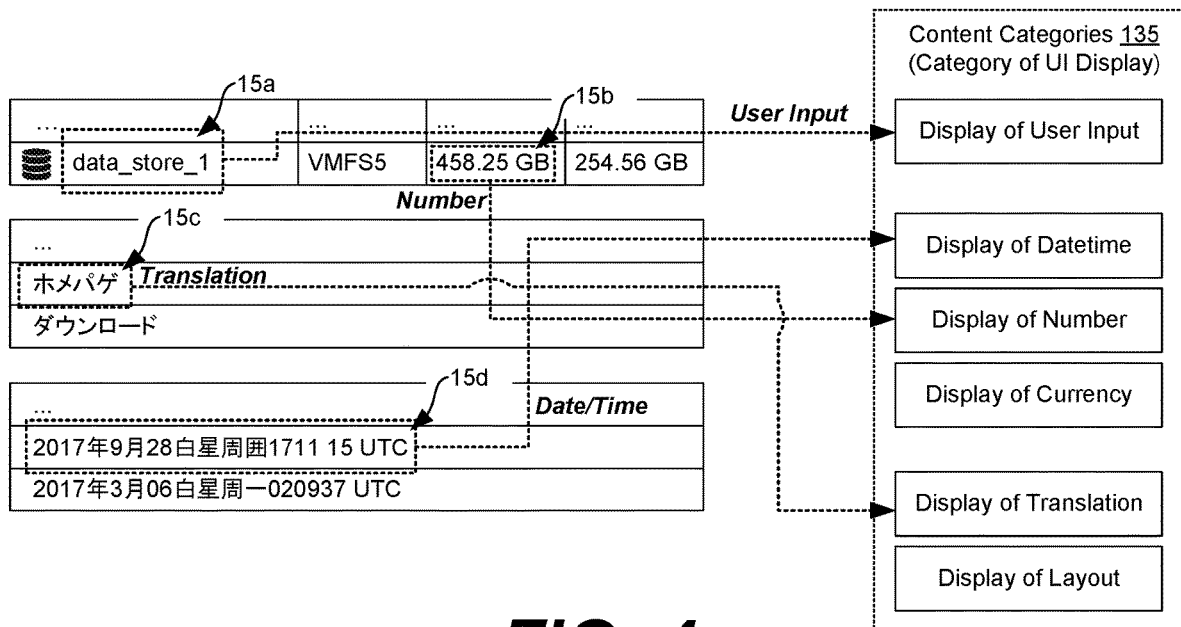
FIG. 4 is a drawing illustrating classification and categorization of different types of content that may be included in a user interface.

Turning now to FIG. 4, a drawing is shown illustrating the classification and categorization of different types of content 15 that may be included in a user interface 20. As can be appreciated, the content 15 of a user interface 20 can be extremely dynamic, and change from day-to-day. Accordingly, the category analysis service 118 can categorize content 15 such that the display verification service 115 can ensure the proper display of the content 15. Additionally, the category analysis service 118 can employ one or more machine learning models to generate and modify a model for the category analysis service 118 such that the classification and categorization of the content 15 can continue to improve over time.

For instance, a user interface 20 can include various content 15a . . . 15d. The category analysis service 118 can identify that the first amount of content 15a includes user input, for instance, based on a database table or other location where the content 15 is stored in the data store 112. Thus, the category analysis service 118 can categorize the content 15 as user input. The display verification service 115 can then determine whether the content 15a to be shown in the user interface 20 is shown properly in a simulated rendering of the user interface 20.

Figure 5:
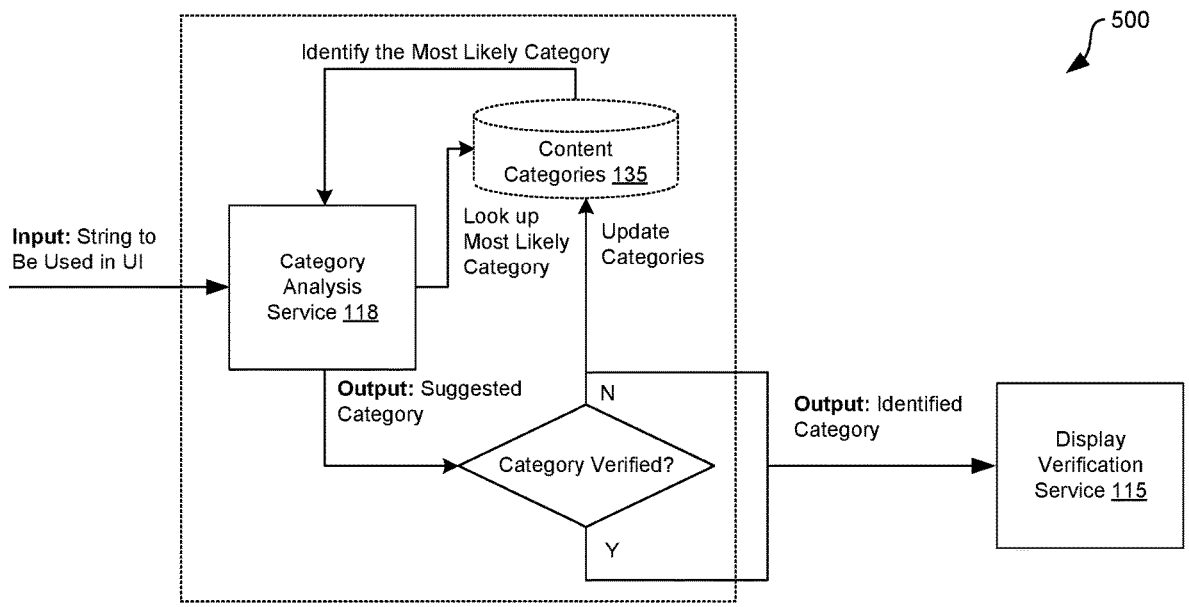
FIG. 5 is a schematic diagram illustrating classification and categorization of different types of content that may be included in a user interface.

Referring next to FIG. 5, a schematic diagram 500 is shown illustrating the classification and categorization of different types of content 15 that may be included in a user interface 20. For instance, the category analysis service 118 can receive an input that includes a string of characters to be used in a user interface 20, such as a web page. The category analysis service 118 can look up a most likely content category 135 for the string, for example, by applying a regular expression, analyzing a format or length of the string, or analyzing characters included in the string.

Once the most likely content category 135 has been identified, the category analysis service 118 can provide an output that includes a suggested content category 135 for the string. Next, the category analysis service 118 can determine whether the content category 135 suggested has been verified. For instance, an administrator of the content category 135 can verify the suggested content category 135. The content categories 135 can be updated based on whether the content category 135 suggested was correct or incorrect. Thus, the classification and categorization of content 15 can continuously be improved. The category analysis service 118 can provide an output of the content category 135 identified to the display verification service 115. The display verification service 115 can determine whether the string is properly shown in a simulated rendering of a web page or other user interface 20, as discussed above with respect to FIGS. 3 and 4.

Figure 6:
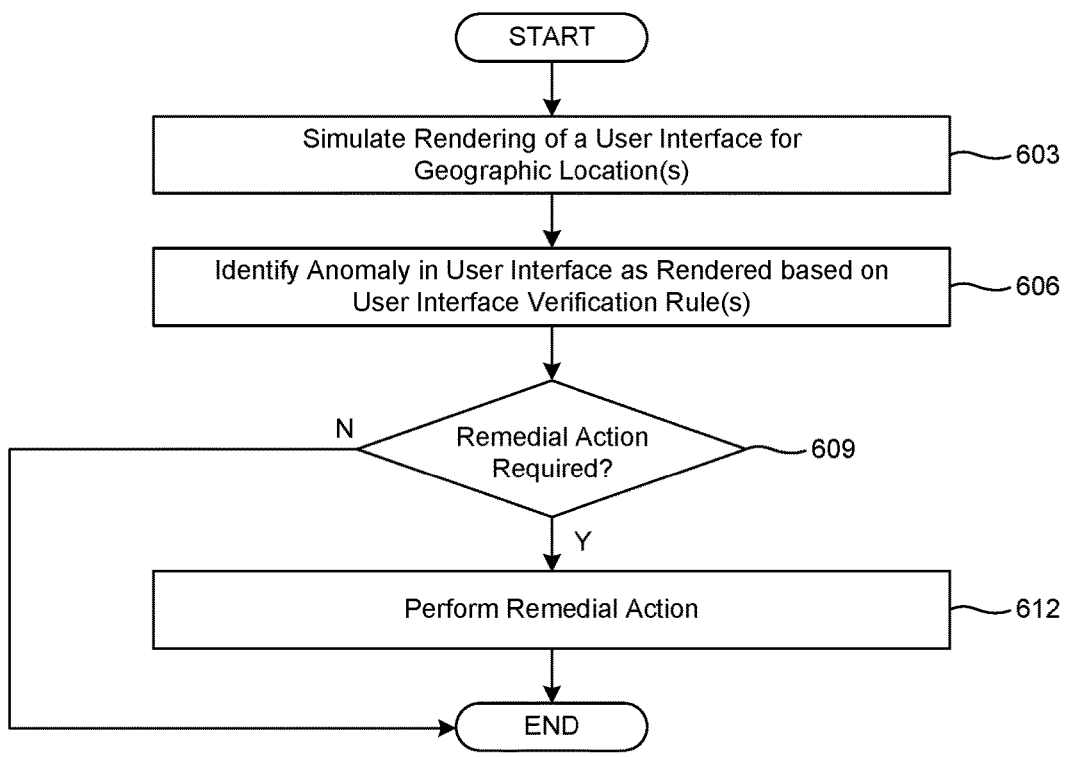
FIG. 6 is a flowchart illustrating an example operation of the display verification service.
Figure 7:
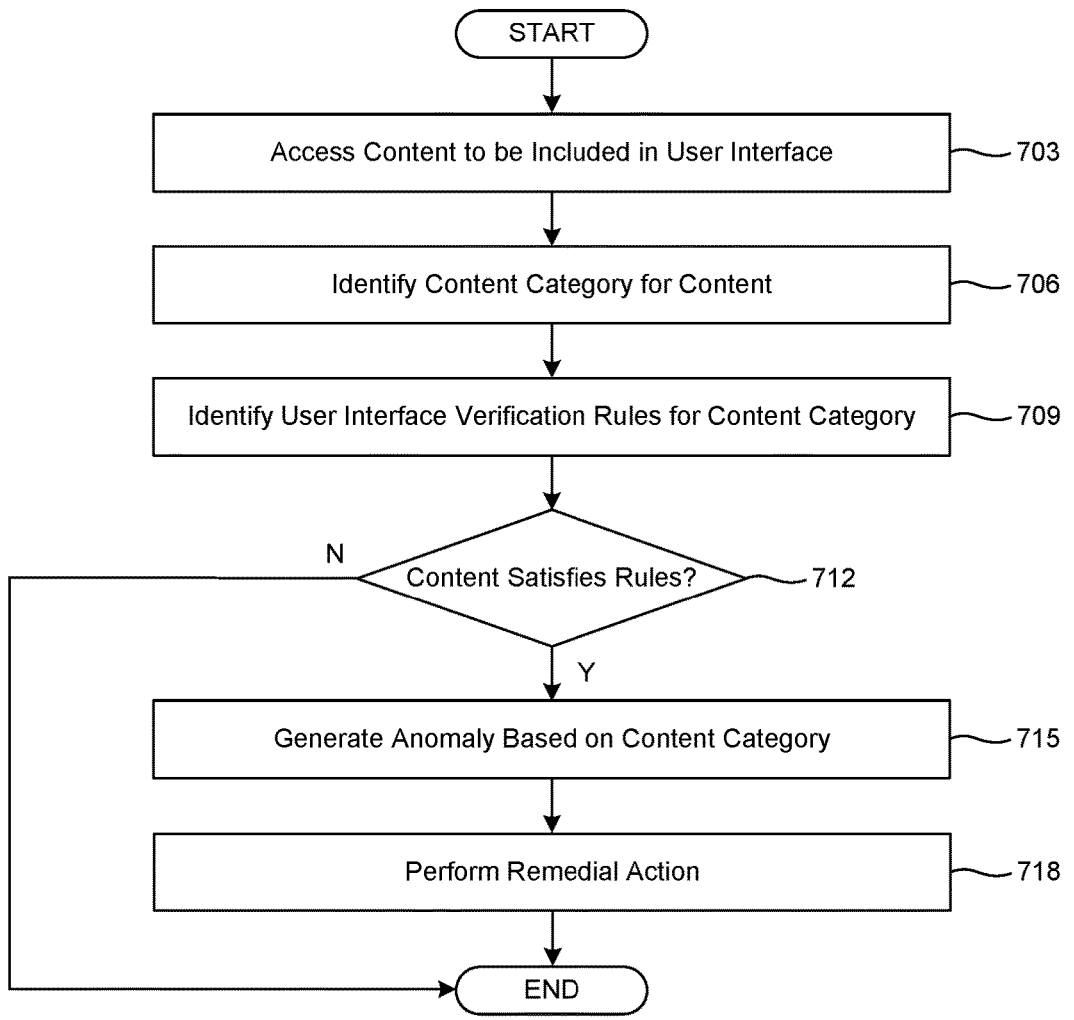
FIG. 7 is another flowchart illustrating an example operation of the display verification service.

Turning now to FIG. 6, a flowchart is shown that provides an example operation of the networked environment 100 when performing an intelligent verification of a display of a user interface 20. Although various operations are shown as being performed by the computing environment 103, in alternative examples, at least a portion of the operations can be performed by the display verification service 115, the category analysis service 118, or other service. The separation or segmentation of functionality as discussed herein is presented for illustrative purposes only.

Beginning with step 603, the display verification service 115 can simulate a rendering of a user interface 20 for one or more geographic locations. In some examples, the display verification service 115 can use a virtual machine 121 to simulate a rendering of the user interface 20. To this end, the display verification service 115 can configure a virtual machine configuration file that specifies a particular web browser application 25 (or other client application), display resolution, language setting, or other setting to be applied by the virtual machine 121 when rendering the user interface 20. The display verification service 115 can dynamically adjust language settings 130 (or other web browser settings 127) to render a web page or other user interface 20 for a geographic location to analyze content 15 rendered by the web browser application 25. Additionally, in some examples, the display verification service 115 can spoof a geographic location of the virtual machine 121 for rendering user interfaces 20 for varying geographic locations. To simulate a rendering of a user interface 20, such as a web page, the virtual machine 121 can access user interface data 133 which can include, for example, an XML or HTML document.

In step 606, the display verification service 115 can identify one or more anomalies 160 from the simulated rendering of the user interface 20 based on, for instance, one or more user interface verification rules 155, where user interface verification rules 155 include criteria that the display verification service 115 can utilize to determine whether a user interface 20 is shown properly in a display 30. To identify an anomaly 160, the display verification service 115 can compare content before being rendered in a user interface 20 with content 15 as rendered in the user interface 20. The user interface verification rule 155 can specify a format that a date should be shown in for a particular geographic region. In the United States, a date may assume the format of "01-31-2020." In Europe, however, a date may assume the format of "2020-01-30." Thus, a user interface verification rule 155 can specify a particular way a date should be shown in a particular geographic location or in association with a particular language. To this end, a user interface verification rule 155 can also be indicative of a remedial action that can be performed by the display verification service 115 to alleviate an identified anomaly.

Similarly, user interface verification rules 155 can specify a proper display a time corresponding to a geographic location, a monetary amount or currency, an intended size of a region, container, or item of the user interface 20, or other criteria. For instance, if a time is displayed incorrectly for a geographic location, the display verification service 115 can identify the incorrect display as an anomaly 160. In another example, a user interface verification rule 155 can specify a proper display a currency corresponding to a geographic location, such as dollars for the United States or the British Pound for the United Kingdom. Additionally, periods or comas can be used interchangeably depending on the geographic location. If a monetary amount or a currency is displayed incorrectly for a geographic location, the display verification service 115 can identify the incorrect display as an anomaly 160. Similarly, if an amount of text causes a container to move or expand for a geographic location, the display verification service 115 can identify the incorrect display as an anomaly 160.

Next, in step 609, the display verification service 115 can determine whether a remedial action is required based on the anomaly 160 identified and/or the user interface verification rule 155. For instance, a remedial action can include notifying an administrator or a web developer regarding an issue with a user interface 20 when rendered for a particular geographic location. Alternatively, the display verification service 115 can determine whether the user interface verification rule 155 specifies a remedial action that can be performed by the display verification service 115 to alleviate the anomaly 160. In one example, if a simulated rendering of a web page includes anomalies 160 that identify improperly encoded characters, the display verification service 115 can update an HTML header of a web page to reflect a proper character set for a geographic location, as follows:

```
<meta http-equiv="Content-Type" content="text/
   html; charset=UTF-8">
```

For instance, with UTF-8, a variable width encoding scheme, several character encoding problems can be alleviated. Additionally, in some examples, the display verification service 115 can adjust a font size such that text fits in a container without reshaping the container.

In step 612, the display verification service 115 can perform the remedial action identified in step 609. Thereafter, the process can proceed to completion.

Turning now to FIG. 6, a flowchart is shown that provides an example operation of the networked environment 100 when performing an intelligent verification of a display of a user interface 20. Although various operations are shown as being performed by the computing environment 103, in alternative examples, at least a portion of the operations can be performed by the display verification service 115, the category analysis service 118, or other service. The separation or segmentation of functionality as discussed herein is presented for illustrative purposes only.

Beginning with step 703, the display verification service 115 can access content 15 to be included in a user interface 20. The content 15 can be stored in the data store 112 as, for example, an XML or HTML document, or as data stored in a database. The display verification service 115 can perform different analyses to verify the proper display of the content 15 in a user interface 20 based on a type of the content accessed in step 703. For instance, an administrator can define one or more user interface verification rules 155 or other criteria to apply based on a content category 135.

Thus, in step 706, the display verification service 115 can identify a content category 135 for the content 15 accessed in step 703. Content categories 135 can include a classification determined for content 15 to be shown in a user interface 20. Content categories 135 can include, for example, user input, a date/time, a number, a monetary amount or currency, a translation, a layout, as well as other categories. As the display verification service 115 can perform different analyses to verify the proper display of the content 15 in a user interface 20, the display verification service 115 can verify whether content 15 is properly shown in a user interface 20 by comparing content 15 to be rendered in a user interface 20 (before the simulated rendering) to the actual content appearing in the simulated rendering of the user interface 20 (after the simulated rendering).

In one example, the display verification service 115 can identify each string or amount of text in a user interface 20 and categorize the text to apply a content-specific approach when verifying the text. For instance, the display verification service 115 can perform string comparisons, regular expression matching, machine translation, and layout detection based on a content category 135.

Next, in step 709, the display verification service 115 can identify one or more user interface verification rules 155 for the content category 135 or for a geographic location. For instance, user interface verification rules 155 can include criteria specified by an administrator that denotes a proper display of a particular type of content 15. For instance, if content 15 to be included in a user interface 20 is a date or a time, the display verification service 115 can utilize the regular expression service 117 to determine whether the format of the date or the time shown in a simulated rendering of a user interface 20 is correct based on a user interface verification rule 155. In some examples, the regular expression service 117 can determine whether a user interface verification rule 155 has been satisfied for the geographic location in the United States or other location that utilizes a similar format using the following regular expression:

```
^(0[1-9]|1[1-2])/(0[1-9]|1[0-9]|2[2-9]|3[0-1])/(1[0-9]
   [0-9][0-9]|2[0-9][0-9][0-9])$
```

In another example, the regular expression service 117 can determine whether a user interface verification rule 155 has been satisfied for Japan or other geographic location having a similar date or time format using the following regular expression:

```
(\\d{4})\u5e74(\\d{1,2})\u6708(\\d{1,2})\u65e5\\s
   (\u4E0A\u5348|\u4E0B\u5348) (\\d{1,2}):
   (\\d{2}):(\\d{2})
```

In another example, the display verification service 115 can verify a display of a number to be included in a user interface 20 based at least in part on a user interface verification rule 155. In some examples, the display verification service 115 can convert a number to be rendered in a user interface 20 to a floating-point number. The display verification service 115 can also convert a number actually shown in the simulated rendering of the user interface 20 to a floating-point number. The two floating-point numbers can then be compared to determine whether the floating-point numbers match. If the floating-point numbers do not match, the display verification service 115 can generate an anomaly 160.

In step 712, the display verification service 115 can determine whether the content 15, as shown in a simulated rendering of the user interface 20, satisfies the user interface verification rules 155 identified in step 709. For instance, the display verification service 115 can verify a display of a currency or a monetary amount based on a user interface verification rule 155 generated for a geographic location. In one example, the display verification service 115 can verify the correct symbols, numbers, and units, as well as the order of the symbols, numbers, and units. For instance, the string "$23,456.56" would be correct for a geographic location that utilized the dollar currency while the string "23.456.5€" would be correct for a geographic location that utilizes the euro currency. Additionally, when the monetary amount of "$23,456.56" is converted to yen or other currency, a longer string of "JP¥ 2610726.86" is used that can cause a table or other HTML container to increase in size, thereby impacting the display. The display verification service 115 can verify a display of the monetary amount such that the longer string does not impair the display of content in the user interface.

In another example, the display verification service 115 can verify a display of a layout of a user interface 20. For instance, the display verification service 115 can compare the size of text to be rendered to text shown in the simulated rendering of the web page or other user interface 20 to determine whether the sizes of the text match. Similarly, the display verification service 115 can compare a size of a container, such as a DIV container in HTML, based on pixel or ratio values. For instance, an HTML document may specify that a table should be one-hundred pixels×one-hundred pixels (or a 1:1 ratio). The display verification service 115 can analyze a size of the table in the simulated rendering of the web page to determine whether the table is actually one-hundred pixels×one-hundred pixels, or is some other size indicative of an anomaly 160 existing in the web page. For instance, if text in a table is not displayed properly, it can cause the size of the table (as actually shown) to adjust, as shown in FIG. 1B. Further, the display verification service 115 can identify potential overlaps or truncations of components in a user interface 20, such as buttons, containers, images, or other content 15. If any of these issues are identified, the display verification service 115 can generate an anomaly 160.

In step 715, the display verification service 115 can generate an anomaly 160 based on the content categories 135 and/or the user interface verification rules 155. In other words, the display verification service 115 can identify one or more anomalies 160 from the simulated rendering of the user interface 20 based on, for instance, one or more user interface verification rules 155, where user interface verification rules 155 include criteria that the display verification service 115 can utilize to determine whether a user interface 20 is shown properly in a display 30. To generate an anomaly 160, the display verification service 115 can compare content before being rendered in a user interface 20 with content 15 as rendered in the user interface 20. For instance, a user interface verification rule 155 can specify a format that a date should be shown in for a particular geographic region. In the United States, a date may assume the format of "01-31-2020." In Europe, however, a date may assume the format of "2020-01-30." Thus, a user interface verification rule 155 can specify a particular way a date should be shown in a particular geographic location or in association with a particular language.

Next, in step 718, the display verification service 115 can perform a remedial action. As noted above, a remedial action can include notifying an administrator or a web developer regarding an issue with a user interface 20 when rendered for a particular geographic location. Alternatively, the display verification service 115 can determine whether the user interface verification rule 155 specifies a remedial action that can be performed by the display verification service 115 to alleviate the anomaly 160. In one example, if a simulated rendering of a web page includes anomalies 160 that identify improperly encoded characters, the display verification service 115 can update an HTML header of a web page to reflect a proper character set for a geographic location. Thereafter, the process can proceed to completion.

The client devices 10 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 120, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 10 can include a display 30 upon which a user interface 20 generated by the agent application 123 or other client application 120 can be rendered. In some examples, the user interface 20 can be generated using user interface data provided by the computing environment 103. The client device 10 can also include one or more input/output devices that can include, for example, a capacitive touchscreen or other type of touch input device, fingerprint reader, or keyboard.

Although the display verification service 115, the category analysis service 118, the client applications 165, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for performing an intelligent verification of a display of a user interface, comprising:
    at least one computing device comprising at least one processor; and
    program instructions in the at least one computing device that, when executed by the at least one processor of the at least one computing device, cause the at least one computing device to:
        for at least one of a plurality of geographic locations, simulate a rendering of a web page using hypertext markup language (HTML) for the at least one of the plurality of geographic locations, wherein rendering of the web page comprises geographic location spoofing for a virtual machine to render the web page corresponding to a spoofed geographic location of the of the virtual machine, wherein the rendering of the web page is simulated to include translated content using a language corresponding to the spoofed geographic location;
        identify an anomaly that causes the translated content to expand beyond an intended region of the web page as rendered, wherein the anomaly is identified based in least in part on an inconsistency between an actual size of the translated content of the web page as rendered, and a size of the intended region that is indicated by a user interface verification rule stored in a data store corresponding to the spoofed geographic location, wherein the user interface verification rule defines an intended size of an amount of text or a container in the web page as rendered, the anomaly comprises the amount of text or the container in the web page as rendered not matching the intended size, and the anomaly is identified based at least in part on a pixel analysis of the amount of text or the container in the web page as rendered;
        in response to the anomaly being identified in the web page, determine a remedial action based at least in part on a type of the anomaly identified; and
        perform the remedial action on the at least one computing device.

2. The system of claim 1, further comprising program instructions executable in the at least one computing device that, when executed by the at least one computing device, cause the at least one computing device to:
    translate text stored in the data store to be dynamically included in the web page from a first language to a second language using a machine-translation service; and
    including the text as translated to the second language in the web page as rendered.

3. The system of claim 1, wherein:
    the user interface verification rule defines a proper display of a date or a time corresponding to the at least one of the plurality of geographic locations;
    the anomaly comprises an improper display of the date or time in the web page as rendered determined based at least in part on the at least one of the plurality of geographic locations; and
    the anomaly is identified based at least in part on a regular expression matching of the date or the time as rendered as compared to the date or the time as stored in a data store.

4. The system of claim 1, wherein:
    the user interface verification rule defines a proper display of a monetary amount corresponding to the at least one of the plurality of geographic locations;
    the anomaly comprises an improper display of the monetary amount in the web page as rendered; and the anomaly is identified based at least in part on a regular expression matching of the monetary amount as rendered as compared to the monetary amount as stored in a data store.

5. The system of claim 1, wherein the user interface verification rule is associated with a particular content category of the translated content.

6. The system of claim 1, wherein:
the user interface verification rule defines an intended display of an amount of text in the web page as rendered;
the anomaly comprises the amount of text not matching the intended display; and
the anomaly is identified based at least in part on a string comparison performed between the amount of text identified from the web page as rendered and the amount of text as stored in the data store.

7. The system of claim 1, wherein the rendering of the web page is simulated in the virtual machine, wherein the virtual machine is configured to comprise one of a plurality of web browser applications, one of a plurality of operating systems, a display resolution, and at least one language preference.

8. A non-transitory computer-readable medium for performing an intelligent verification of a display of a user interface embodying program instructions in a client device that, when executed by the client device, cause the client device to:
for at least one of a plurality of geographic locations, simulate a rendering of a web page using hypertext markup language (HTML) for the at least one of the plurality of geographic locations, wherein rendering of the web page comprises geographic location spoofing for a virtual machine to render the web page corresponding to a spoofed geographic location of the of the virtual machine, wherein the rendering of the web page is simulated to include translated content using a language corresponding to the spoofed geographic location;
identify an anomaly that causes the translated content to expand beyond an intended region of the web page as rendered, wherein the anomaly is identified based in least in part on an inconsistency between an actual size of the translated content of the web page as rendered, and a size of the intended region that is indicated by a user interface verification rule stored in a data store corresponding to the spoofed geographic location, wherein the user interface verification rule defines an intended size of an amount of text or a container in the web page as rendered, the anomaly comprises the amount of text or the container in the web page as rendered not matching the intended size, and the anomaly is identified based at least in part on a pixel analysis of the amount of text or the container in the web page as rendered;
in response to the anomaly being identified in the web page, determine a remedial action based at least in part on a type of the anomaly identified; and
perform the remedial action on the at least one computing device.

9. The non-transitory computer-readable medium of claim 8, further comprising program instructions executable in the at least one computing device that, when executed by the at least one computing device, cause the at least one computing device to:
translate text stored in the data store to be dynamically included in the web page from a first language to a second language using a machine-translation service; and
including the text as translated to the second language in the web page as rendered.

10. The non-transitory computer-readable medium of claim 8, wherein:
the user interface verification rule defines a proper display of a date or a time corresponding to the at least one of the plurality of geographic locations;
the anomaly comprises an improper display of the date or time in the web page as rendered determined based at least in part on the at least one of the plurality of geographic locations; and
the anomaly is identified based at least in part on a regular expression matching of the date or the time as rendered as compared to the date or the time as stored in a data store.

11. The non-transitory computer-readable medium of claim 8, wherein:
the user interface verification rule defines a proper display of a monetary amount corresponding to the at least one of the plurality of geographic locations;
the anomaly comprises an improper display of the monetary amount in the web page as rendered; and
the anomaly is identified based at least in part on a regular expression matching of the monetary amount as rendered as compared to the monetary amount as stored in a data store.

12. The non-transitory computer-readable medium of claim 8, wherein the user interface verification rule is associated with a particular content category of the translated content.

13. The non-transitory computer-readable medium of claim 8, wherein:
the user interface verification rule defines an intended display of an amount of text in the web page as rendered;
the anomaly comprises the amount of text not matching the intended display; and
the anomaly is identified based at least in part on a string comparison performed between the amount of text identified from the web page as rendered and the amount of text as stored in the data store.

14. The non-transitory computer-readable medium of claim 8, wherein the rendering of the web page is simulated in the virtual machine, wherein the virtual machine is configured to comprise one of a plurality of web browser applications, one of a plurality of operating systems, a display resolution, and at least one language preference.

15. A computer-implemented method for performing an intelligent verification of a display of a user interface, comprising:
simulating, for at least one of a plurality of geographic locations, a rendering of a web page using hypertext markup language (HTML) for the at least one of the plurality of geographic locations, wherein rendering of the web page comprises geographic location spoofing for a virtual machine to render the web page corresponding to a spoofed geographic location of the of the virtual machine, wherein the rendering of the web page is simulated to include translated content using a language corresponding to the spoofed geographic location;
identifying an anomaly that causes the translated content to expand beyond an intended region of the web page as rendered, wherein the anomaly is identified based in least in part on an inconsistency between an actual size of the translated content of the web page as rendered, and a size of the intended region that is indicated by a user interface verification rule stored in a data store corresponding to the spoofed geographic location, wherein the user interface verification rule defines a proper display of a date or a time corresponding to the at least one of the plurality of geographic locations, the anomaly comprises an improper display of the date or time in the web page as rendered determined based at least in part on the at least one of the plurality of geographic locations, and the anomaly is identified based at least in part on a regular expression matching of the date or the time as rendered as compared to the date or the time as stored in a data store;

in response to the anomaly being identified in the web page, determining a remedial action based at least in part on a type of the anomaly identified; and performing the remedial action on the at least one computing device.

16. The computer-implemented method of claim 15, further comprising:

translating text stored in the data store to be dynamically included in the web page from a first language to a second language using a machine-translation service; and including the text as translated to the second language in the web page as rendered.

17. The computer-implemented method of claim 15, wherein the user interface verification rule is associated with a particular content category of the translated content.

18. The computer-implemented method of claim 15, wherein:

the user interface verification rule defines a proper display of a monetary amount corresponding to the at least one of the plurality of geographic locations;

the anomaly comprises an improper display of the monetary amount in the web page as rendered; and the anomaly is identified based at least in part on a regular expression matching of the monetary amount as rendered as compared to the monetary amount as stored in a data store.

19. The computer-implemented method of claim 15, wherein:

the user interface verification rule defines an intended size of an amount of text or a container in the web page as rendered;

the anomaly comprises the amount of text or the container in the web page as rendered not matching the intended size; and the anomaly is identified based at least in part on a pixel analysis of the amount of text or the container in the web page as rendered.

20. The computer-implemented method of claim 15, wherein the rendering of the web page is simulated in the virtual machine, wherein the virtual machine is configured to comprise one of a plurality of web browser applications, one of a plurality of operating systems, a display resolution, and at least one language preference.

* * * * *